United States Patent
Shimada et al.

(10) Patent No.: US 11,905,649 B2
(45) Date of Patent: Feb. 20, 2024

(54) FIBER CORD FOR REINFORCEMENT AND METHOD FOR PRODUCING THE SAME

(71) Applicant: TEIJIN LIMITED, Osaka (JP)

(72) Inventors: Shintaro Shimada, Osaka (JP); Shuhei Okamura, Osaka (JP)

(73) Assignee: TEIJIN FRONTIER CO., LTD., Osaka (JP)

( * ) Notice: Subject to any disclaimer, the term of this patent is extended or adjusted under 35 U.S.C. 154(b) by 977 days.

(21) Appl. No.: 16/513,950

(22) Filed: Jul. 17, 2019

(65) Prior Publication Data

US 2019/0338460 A1 Nov. 7, 2019

Related U.S. Application Data

(62) Division of application No. 15/039,954, filed as application No. PCT/JP2013/083833 on Dec. 18, 2013, now abandoned.

(51) Int. Cl.

| | | |
|---|---|---|
| *D06M 13/395* | (2006.01) | |
| *D06M 15/41* | (2006.01) | |
| *D06M 15/693* | (2006.01) | |
| *D06M 15/227* | (2006.01) | |
| *D06M 15/55* | (2006.01) | |
| *C08J 5/06* | (2006.01) | |
| *D02G 3/04* | (2006.01) | |
| *D02G 3/36* | (2006.01) | |
| *C09J 5/02* | (2006.01) | |
| *C09J 161/12* | (2006.01) | |
| *D01F 6/62* | (2006.01) | |
| *D06M 101/32* | (2006.01) | |

(52) U.S. Cl.
CPC .............. *D06M 13/395* (2013.01); *C08J 5/06* (2013.01); *C09J 5/02* (2013.01); *C09J 161/12* (2013.01); *D01F 6/62* (2013.01); *D02G 3/04* (2013.01); *D02G 3/36* (2013.01); *D06M 15/227* (2013.01); *D06M 15/41* (2013.01); *D06M 15/55* (2013.01); *D06M 15/693* (2013.01); *D06M 2101/32* (2013.01)

(58) Field of Classification Search
CPC .............. B60C 9/0042; B32B 2255/26; B32B 2255/28; B32B 2262/0276; B32B 27/04; B32B 27/36; Y10T 428/2933; Y10T 428/2913; Y10T 428/2971; Y10T 428/249944; Y10T 428/24994; Y10S 156/91; D02G 3/36; D02G 3/48; D01F 6/62; C08J 5/06; C08J 7/043; D06M 13/395; D06M 17/04; D06M 2101/32; C08G 2380/00; C08G 2170/80; C09J 5/02
USPC .............. 252/183.11; 8/115.67; 474/268; 156/308.8, 315, 910; 428/375, 364, 428/295.1, 297.4, 396
See application file for complete search history.

(56) References Cited

U.S. PATENT DOCUMENTS

| | | | |
|---|---|---|---|
| 5,891,561 A | 4/1999 | Kinoshita et al. | |
| 6,528,113 B1 | 3/2003 | Watanabe et al. | |
| 2001/0055667 A1 | 12/2001 | Kinoshita et al. | |
| 2003/0198794 A1 | 10/2003 | Fukuyama | |
| 2006/0280942 A1* | 12/2006 | Watanabe | C08J 5/06 428/375 |
| 2007/0205393 A1* | 9/2007 | Durairaj | C08G 18/8074 252/183.11 |
| 2007/0243375 A1 | 10/2007 | Kohashi et al. | |
| 2017/0016176 A1 | 1/2017 | Shimada et al. | |

FOREIGN PATENT DOCUMENTS

| | | |
|---|---|---|
| JP | 02-251680 A | 10/1990 |
| JP | 9-158989 A | 6/1997 |
| JP | 11-81152 A | 3/1999 |
| JP | 2001-064840 A | 3/2001 |
| JP | 2003-221787 A | 8/2003 |
| JP | 2003-306872 A | 10/2003 |
| JP | 2009-299220 A | 12/2009 |
| JP | 2010-53465 A | 3/2010 |
| JP | 2011-236388 A | 11/2011 |
| JP | 2011-241513 A | 12/2011 |

(Continued)

OTHER PUBLICATIONS

Communication dated Nov. 23, 2017, issued by the European Patent Office in corresponding European Application No. 13899812.5.
International Search Report for PCT/JP2013/083833 dated Feb. 25, 2014.
Machine translation for JP 2011-236388 (Year: 2011); 33 pages total.

*Primary Examiner* — Camie S Thompson
(74) *Attorney, Agent, or Firm* — Sughrue Mion, PLLC

(57) ABSTRACT

A fiber cord for reinforcement has an adhesive treatment agent attached to a surface thereof and includes, in an inner layer part thereof, two kinds of compounds each having a molecular weight of less than 1,000. The main compound is an aromatic compound or contains an α-dicarboxylic acid component, and the other compound is an aliphatic compound or an alicyclic compound. It is preferable that the adhesive treatment agent is a resorcin-formalin-latex-based adhesive, that the fiber cord includes a twisted synthetic fiber, that the aromatic compound is a heterocyclic compound, that the main compound is located only in the inner layer part of the fiber cord, that a compound having a hexamethylene diisocyanate trimer structure is present, and that no latex is present in the inner layer part of the fiber cord. This fiber cord is produced through a two-stage treatment with a pre-treatment liquid and adhesive treatment liquid.

5 Claims, No Drawings

(56) References Cited

FOREIGN PATENT DOCUMENTS

JP         2014-25188 A    2/2014
WO      2005/026239 A1   3/2005

\* cited by examiner

FIBER CORD FOR REINFORCEMENT AND METHOD FOR PRODUCING THE SAME

CROSS REFERENCE TO RELATED APPLICATIONS

This application is a divisional of application Ser. No. 15/039,954 filed May 27, 2016, which is a National Stage of International Application No. PCT/JP2013/083833 filed Dec. 18, 2013, the contents of which are incorporated herein by reference in their entirety.

TECHNICAL FIELD

The present invention relates to a fiber cord for reinforcement. It more specifically relates to a fiber cord for reinforcement having significantly improved fraying resistance, and also to a method for producing the same.

BACKGROUND ART

In recent years, to deal with the global environmental destruction, petroleum resource depletion, and like problems, a great amount of attention has been paid to energy saving and energy substitution for automobiles, electric appliances, etc. In particular, with automotive weight reduction for improving the fuel efficiency, the need for the weight and size reduction of components is rapidly increasing. As such components, fiber-reinforced composite materials have been widely used.

However, such composite materials containing fibers for reinforcement have the problem that when the material is once shaped and then cut, the fibers are frayed at the cut face. This phenomenon is especially prominent in fiber-reinforced rubber composite materials such as belts. Because the rubber forming the matrix of the composite is prone to deformation, high-strength fibers for reinforcement, which hardly follow the deformation, are exposed at the end face of the composite material, and this is likely to cause the problematic fraying.

As one technique for reducing such fraying, a method that treats a fiber with a solvent-based adhesive is known (e.g., PTL 1 and PTL 2). However, such organic-solvent-based adhesive treatments have problems in that a heavy load is placed on the safety or working environment, and also the costs for adhesive treatment facilities, recovery/waste liquid disposal, and peripheral facilities thereof are extremely high.

Thus, in order to deal with the above problems, a method for producing an adhesive-treated fiber using a water-based adhesive has been tried. For example, PTL 3 proposes a fiber cord for reinforcement, in which a first layer of the fiber cord is treated with a water-based adhesive including a water-based urethane resin, an epoxy compound, a blocked polyisocyanate, and a rubber latex, and a second layer is treated with a resorcin-formalin-latex (RFL)-based adhesive.

However, with these water-based techniques, under the present circumstances, the high-level adhesion, fraying resistance, and fatigue resistance required for automotive transmission belts, etc., have not been achieved to the levels of solvent-based techniques.

PTL 1: JP-A-9-158989
PTL 2: JP-A-11-81152
PTL 3: JP-A-2003-221787

SUMMARY OF THE INVENTION

Technical Problem

The invention has been accomplished in view of the above background problems and art. An object of the invention is to provide a fiber cord for reinforcement having significantly improved fraying resistance and being excellent in adhesion to the matrix and fatigue resistance (durability), and also a method for producing the same.

Solution to Problem

The fiber cord for reinforcement of the invention is a fiber cord for reinforcement having an adhesive treatment agent attached to the surface thereof, characterized in that the fiber cord includes, in an inner layer part thereof, a compound $A_1$ having a molecular weight of less than 1,000 and a smaller amount of a compound $B_1$ than the compound $A_1$, the compound $A_1$ being an aromatic compound or a compound containing an α-dicarboxylic acid component, the compound $B_1$ being an aliphatic compound or an alicyclic compound.

Further, it is preferable that the adhesive treatment agent is a resorcin-formalin-latex (RFL)-based adhesive, the fiber cord includes a twisted multifilament fiber or a synthetic fiber, and the aromatic compound is a heterocyclic compound. In addition, it is preferable that the compound $A_1$ is located only in the inner layer part of the fiber cord, a compound having a hexamethylene diisocyanate (HDI) trimer structure is present in the inner layer part of the fiber cord, and no latex is present in the inner layer part of the fiber cord.

In addition, the method for producing a fiber cord for reinforcement of the invention is a method for producing a fiber cord for reinforcement, including treating a fiber cord in two stages with a pre-treatment liquid and an adhesive treatment liquid. The method is characterized in that the pre-treatment liquid contains two kinds of blocked isocyanate compounds that are a compound $A_2$ and a smaller amount of a compound $B_2$, the compound $A_2$ having an isocyanate group blocked with an aromatic compound or a compound containing an α-dicarboxylic acid component, the compound $B_2$ having an isocyanate group blocked with an aliphatic compound or an alicyclic compound, and a fiber cord having the pre-treatment liquid attached thereto is once subjected to a heat treatment, and then the adhesive treatment liquid is attached thereto, followed by a drying treatment.

Further, it is preferable that the aromatic compound is a heterocyclic compound, and the unblocking temperature of the compound $A_2$ is lower than the unblocking temperature of the compound $B_2$. In addition, it is preferable that the compound $A_2$ has a hexamethylene diisocyanate (HDI) trimer structure, and the compound $B_2$ has an isocyanate group blocked with an aliphatic compound or an alicyclic compound.

Advantageous Effects of the Invention

According to the invention, a fiber cord for reinforcement having significantly improved fraying resistance and being excellent in adhesion to the matrix and fatigue resistance (durability) and a method for producing the same are provided.

DESCRIPTION OF EMBODIMENTS

The fiber cord for reinforcement of the invention has an adhesive treatment agent attached to the surface thereof. The adhesive treatment agent herein is not particularly limited and selected from those suitable for a structure (matrix) to be reinforced with fibers. However, more specifically, for example, in the case where the matrix is a rubber or the like, it is preferable that the adhesive treatment agent is a resorcin-formalin-latex (RFL)-based adhesive.

Then, the fiber forming the fiber cord for reinforcement used in the invention is in a fibrous form to reinforce the matrix of the structure, and it is preferable that this fiber is a synthetic fiber. More specifically, for example, it is preferable that the fiber is a synthetic fiber made of at least one kind of synthetic resin selected from polyesters, polyarylates, aliphatic polyamides, vinylon, wholly aromatic polyamides, polyparabenzobisoxazole, and carbon fibers. Among them, organic fibers are preferable, and polyester fibers and wholly aromatic polyamide fibers are particularly preferable. Examples of preferred polyester fibers include a polyethylene terephthalate fiber, a polybutylene terephthalate fiber, and a polyethylene-2,6-naphthalate fiber. Examples of preferred wholly aromatic polyamide fibers include wholly aromatic para-type polyamide fibers and meta-type polyamide fibers. However, in terms of reinforcement, high-strength para-type aromatic polyamide fibers are preferable. In addition, in terms of the balance between strength and adhesion, further, it is preferable that the fiber forming the fiber cord is at least one kind of polyester fiber selected from polyethylene terephthalate, polyethylene-2,6-naphthalate, and the like.

As the applications of the fiber cord for reinforcement of the invention, it is preferable that the fiber cord is used as a rubber fiber composite, particularly a cord of a rubber belt. In particular, in the case where the fiber cord is used as a belt cord, the use of the above fiber makes the fiber cord more optimal in terms of tensile strength performance, dimensional stability, durability, and general versatility.

Here, it is preferable that the fiber cord for reinforcement of the invention is a single yarn or an assembly of several yarns. Then, it is also preferable that a single yarn forming the fiber cord for reinforcement itself is an assembly of several fiber filaments in the form of a bundle. It is preferable that the fineness of the single yarn (assembly of fiber filaments) is 500 to 4,000 dtex, still more preferably 1,000 to 3,000 dtex. Such a yarn is particularly effective in terms of handleability in the steps of twisting, adhesive treatment, and shaping. It is preferable that the total fineness of the fiber cord for reinforcement of the invention, which is an assembly of such yarns, is 500 to 15,000 dtex. Incidentally, no particular limitations are imposed on the number of filaments of the fiber, its cross-sectional shape, the physical properties of the fiber, the microstructure, the polymer properties (molecular weight, terminal functional group concentration, etc.), additives in the polymer, etc. In addition, it is also preferable that the fiber yarn has been previously pre-treated with an epoxy resin, a urethane resin, or the like in the stage of yarn-making or after yarn making.

The fiber cord for reinforcement used in the invention is an assembly of one or more such yarns, and it is still more preferable that it is a twisted cord. Further, it is preferable that the fiber cord is obtained by aligning and twisting one or more such yarns (first twisting) and then aligning and twisting two or more such twisted yarns (second twisting). Twisting particularly improves the bending fatigue resistance and the like. Here, it is preferable that the number of twists represented by the following equation (1) is within a range such that the twist coefficient K satisfies 300 to 1,200, more preferably K=500 to 1,000. When such a number of twists is satisfied, the bending fatigue resistance is satisfied while maintaining the penetration of the adhesive into the fiber cord to exert fraying resistance.

[Equation 1]

$$K = T \times \sqrt{D} \quad (1)$$

(wherein K: twist coefficient, T: the number of twists per m [twists/m], D: total fineness [dtex])

When the twist coefficient K is less than 300, the bending fatigue resistance and adhesion tend to decrease. Meanwhile, in the case where K is more than 1,200, there is a tendency that the strength decreases, and also the treatment agent (first adhesive treatment agent) is unlikely to sufficiently penetrate into the fiber cord, resulting in a decrease in fraying resistance.

Incidentally, in the case where the fiber cord for reinforcement of the invention is obtained by aligning and twisting one or more fiber yarns (first twisting) and then aligning and twisting two or more such twisted yarns (second twisting) as described above, it is preferable that the first twisting and second twisting both satisfy the twist coefficient K=300 to 1,200, and the twist coefficients of the first twisting and the second twisting may be the same or different.

The fiber cord for reinforcement of the invention is a fiber cord for reinforcement having an adhesive treatment agent attached to the surface of such a fiber cord. Then, the fiber cord includes, in the inner layer part thereof, a compound $A_1$ having a molecular weight of less than 1,000 and a smaller amount of a compound $B_1$ than the compound $A_1$. Here, the compound $A_1$ is an aromatic compound or a compound containing an α-dicarboxylic acid component, and the compound $B_1$ is an aliphatic compound or an alicyclic compound. Here, it is preferable that the compound $B_1$ is a compound other than the compound $A_1$, which is structurally different from the compound $A_1$. More specifically, it is preferable that the compound $B_1$ is a compound that does not contain an aromatic compound or an α-dicarboxylic acid component.

Here, the compound $A_1$ present in the inner layer part of the fiber cord of the invention is a compound having a molecular weight of less than 1,000, and is an aromatic compound or a compound containing an α-dicarboxylic acid component. Such compounds are structurally prone to resonance because of the presence of a double bond. In addition, here, aromatic compounds are not limited to ordinary aromatic compounds composed only of carbon atoms. Heterocyclic compounds having a cyclic structure formed by nitrogen or like atoms in addition to carbon and having aromatic properties, that is, heterocyclic aromatic compounds, are also preferable. Specific examples of compounds particularly preferable as the compound $A_1$ include phenols such as phenol, thiophenol, cresol, and resorcinol, aromatic secondary amines such as diphenylamine and xylidine, heterocyclic compounds such as dimethylpyrazole, and α-dicarboxylic acids such as diethyl malonic acid. Among them, dimethylpyrazole, which is a heterocyclic aromatic compound, is particularly preferable.

In addition, the compound $B_1$ present inside the fiber cord in an amount smaller than that of the compound $A_1$ (weight ratio) is an aliphatic compound or alicyclic compound having no aromatic properties. Such compounds $B_1$ are ordinary compounds that do not have a resonance structure like the compound $A_1$. In addition, with respect to the molecular weight of the compound $B_1$, similarly to the compound $A_1$, a compound having a molecular weight of less than 1,000 is preferable. More specifically, examples of compounds particularly preferable as the compound $B_1$ include phthalic imides, lactams such as caprolactam and valerolactam, oximes such as methylethylketoxime, and aliphatic compounds such as acidic sodium sulfite. Among them, ε-caprolactam, which is a lactam, is particularly preferable. Further, in the case where dimethylpyrazole is used as the compound $A_1$, when a lactam is combined therewith as the compound $B_1$, the impregnation of the agent into the fiber is excellent, and the performance of the fiber cord is particularly improved.

In the inner layer part of the fiber cord for reinforcement of the invention, the compounds $A_1$ and $B_1$ each having a molecular weight of less than 1,000 as described above are contained, and further it is preferable that the molecular weights of these compounds are each 60 or more and less than 600.

In addition, it is necessary that the content of the compound $A_1$ in the fiber cord inner layer part is higher than the content of the compound $B_1$ (weight ratio), and further it is preferable that the abundance ratio between the compound $A_1$ and the compound $B_1$ (weight ratio), $A_1/B_1$ ratio, is within a range of 60/40 to 95/5.

Here, when the solids weight ratio of compound $A_1$/compound $B_2$ is increased, the film formation inside the fiber bundle tends to take place more effectively. Thus, a firm film is formed, and, when the fiber cord of the invention is eventually used for a composite, improved fraying resistance is provided. This attributes to the fact that the compound $A_1$, which is a compound prone to having a resonance structure, has high reactivity and is effective in film formation. That is, specifically, it is preferable that the abundance ratio of $A_1/B_1$ is at least 60/40. Meanwhile, in the case where the solids weight ratio of compound $A_1$/compound $B_2$ is too high, there is a tendency that the film inside the fiber is likely to be hard and brittle, and the bending fatigue resistance and durability tend to decrease. It is preferable that the solids weight ratio of compound $A_1$/compound $B_2$ is 95/5 or less. It is preferable that such compounds $A_1$ and $B_1$ are attached in an amount within a range of 0.0001 to 0.2 wt % relative to the fiber.

In addition, in the inner layer part of the fiber cord for reinforcement of the invention, in addition to these relatively low-molecular compounds, it is preferable that high-molecular compounds derived from epoxy compounds and the like are also present. Further, with respect to the compounds $A_1$ and $B_1$ present inside the fiber bundle, it is preferable that the total amount thereof attached is within a range of 0.01 wt % to 2 wt % relative to the amount (weight) of other components attached to the fiber, such as high-molecular compounds. When such high-molecular compounds, that is, resin-like substances, are present in large amounts in the inner layer of the fiber bundle, high bundling properties can be obtained. When the abundances of the compounds $A_1$ and $B_1$ are too high, conversely, the adhesion to the matrix tends to decrease, while when the abundances are too low, there is a tendency that the fiber cord is difficult to bundle, resulting in a decrease in fraying resistance.

Here, as high-molecular compounds present in the fiber bundle inner layer of the invention, epoxy compounds, latex rubbers, and the like are preferable. As epoxy compounds, it is preferable that an epoxy compound having an epoxy group is attached to the fiber surface, followed by a heat treatment or the like to increase the molecular weight. Specific examples thereof include reaction products between a polyalcohol such as ethylene glycol, glycerol, sorbitol, pentaerythritol, or polyethylene glycol and a halogen-containing epoxide such as epichlorohydrin; reaction products between a polyphenol such as resorcin, bis(4-hydroxyphenyl)dimethylmethane, a phenol-formaldehyde resin, or a resorcin-formaldehyde resin and a halogen-containing epoxide as described above; and polyepoxide compounds prepared by oxidizing an unsaturated compound with peracetic acid, hydrogen peroxide, or the like, that is, 3,4-epoxycyclohexene epoxide, 3,4-epoxycyclohexylmethyl-3,4-epoxycyclohexene carboxylate, bis(3,4-epoxy-6-methylcyclohexylmethyl)adipate, and the like. Among them, a reaction product between a polyalcohol and epichlorohydrin, that is, a polyglycidyl ether compound of a polyalcohol, develops excellent performance and thus is particularly preferable. It is preferable that the ratio between the epoxy compound and the total amount of the compounds $A_1$ and $B_1$ (epoxy compound)/(compound $A_1$+compound $B_1$) is within a range of 1/2 to 6/1.

Further, in order to facilitate adhesion to the surface adhesive layer or to the matrix component of the final composite material, it is preferable that an isocyanate component is contained in the inner layer of the fiber cord. In particular, in order to suppress deactivation during the process, it is preferable that an isocyanate component derived from a blocked polyisocyanate compound is contained.

Further, in the invention, it is preferable that the isocyanate component is derived from a compound having a hexamethylene diisocyanate (HDI) trimer structure represented by the following chemical structural formula (I).

[Chemical Formula 1]

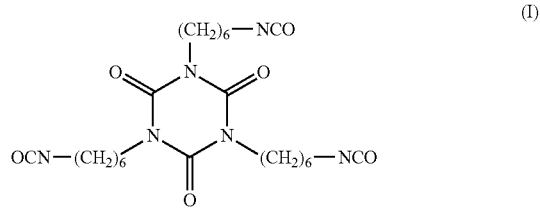

(I)

As shown in the above chemical structural formula (I), this compound is a compound having, as its basic structure, a trimer structure in which three terminal NCO groups of the hexamethylene diisocyanate (HDI) form a cyclic structure. Further, as each trimer structure, as shown in the following chemical structural formula (II), for example, a compound condensed to further increase the functionality is also preferable. Here, R of chemical structural formula (II) can be selected from polyglycols, such as polyethylene glycol, without impairing the affinity for water and heat resistance.

[Chemical Formula 2]

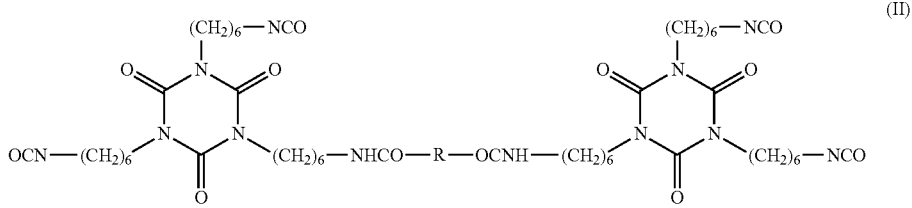

(II)

In addition, as the isocyanate component, it is preferable that the number of NCO functional groups present in the molecule is three or more, whereby the adhesion can be further improved.

As other isocyanate components, components derived from a diphenylmethane diisocyanate (MDI) compound are preferable. Components derived from a compound having a hexamethylene diisocyanate (HDI) trimer structure described above are flexible, while components derived from a diphenylmethane diisocyanate (MDI) compound are rigid. Accordingly, when these two kinds of components are present together, a film that is firm, dense, and also flexible is formed in the inner layer part of the fiber cord. Then, the fiber cord for reinforcement of the invention allows for more significant improvements in, in addition to fraying resistance, bending fatigue resistance and adhesion.

In the fiber cord for reinforcement of the invention, as described above, the compound $A_1$ and the compound $B_1$ are contained in the inner layer part of the fiber cord, and the surface of the fiber cord has attached thereto an adhesive treatment agent. Here, the adhesive treatment agent can be suitably changed according to the object to be reinforced with the fiber cord. Among them, particularly in the case where the fiber cord of the invention is used to reinforce a rubber product such as a belt, it is preferable to use a resorcin-formalin-latex (RFL)-based adhesive as the adhesive treatment agent.

Here, RFL-based adhesives preferable to use will be described. It is preferable that the molar ratio between resorcin and formaldehyde in the resorcin-formalin-rubber latex (RFL) is within a range of 1/0.6 to 1/8, more preferably within a range of 1/0.8 to 1/6. When the amount of formaldehyde added is too small, the crosslinking density of the resorcin-formalin condensate decreases, and the molecular weight also decreases. Accordingly, the cohesive strength of the adhesive layer may decrease, resulting in a decrease in adhesion and also a decrease in bending fatigue resistance. In addition, on the other hand, when the amount of formaldehyde added is too large, the resorcin-formalin condensate tends to be hard due to an increase in crosslinking density. Then, at the time of covulcanization with the adherend rubber, the compatibilization between RFL and the rubber may be inhibited, resulting in a decrease in the adhesion of the fiber cord for reinforcement.

In addition, with respect to the blending ratio between resorcin-formalin (RF) and latex (L) in this adhesive, the RF/L solids weight ratio is 1/3 to 1/16, more preferably 1/4 to 1/10. When the proportion of the rubber latex is too low, the amount of components to be covulcanized with a rubber is small, and thus the adhesion strength is likely to decrease. On the other hand, when the proportion of the rubber latex is too high, it becomes difficult to obtain sufficient strength as an adhesive film. Further, the adhesion strength and durability tend to decrease, and also the stickiness of the adhesive-treated fiber cord tends to be too high. Accordingly, gumming-up, handleability deterioration, or the like may occur in the adhesive treatment step or shaping step, resulting in a decrease in process-passing properties.

Further, as the latex forming the RFL-based adhesive, various latexes such as vinyl pyridine-styrene-butadiene (VpSBR) latex, chlorosulfonated polyethylene (CSM) latex, and polybutadiene (PB) latex are usable. It is particularly preferable that the latex includes VpSBR latex and/or CSM latex and PB latex. In addition, with respect to their solids weight ratio, defining the total weight of "VpSBR latex and/or CSM latex" as $L_1$ and the weight of "PB latex" as $L_2$, it is preferable that the $L_1/L_2$ ratio is within a range of 25/75 to 75/25.

It is optimal to use the above latexes particularly in the case where the fiber cord for reinforcement of the invention is used, among rubber reinforcement applications, particularly for a transmission belt. Usually, in a compressed rubber layer of a transmission belt, a low-adhesion, high-performance synthetic rubber, such as ethylene-α-olefin-diene rubber, chloroprene rubber, hydrogenated nitrile rubber, chlorosulfonated polyethylene rubber, or styrene-butadiene rubber, is used. In contrast, the fiber cord for reinforcement of the invention employs the above composition and compositional proportions, and thus has high affinity and covulcanizability. In the invention, it is important to have high affinities both for the polymer forming the fiber cord and for other agents, and it has become possible to improve the fraying resistance, bending fatigue resistance, and adhesion at higher levels.

It is preferable that the solids weight ratio of $L_1/L_2$ in the fiber cord of the invention is within a range of 25/75 to 75/25 as described above. Further, it is more preferable that the solids weight ratio of $L_1/L_2$ is 30/70 to 70/30. In the case where $L_1$ is too low, the affinities for the polymer forming the fiber cord and for the rubber forming the transmission belt decrease. Accordingly, the adhesion strength tends to decrease, and the bending fatigue resistance and adhesion of the final product also tend to decrease. Meanwhile, in the case where $L_1$ is too large, the unsaturated bonding of the latex in the adhesive treatment agent is reduced. Accordingly, there is a tendency that the covulcanizability with the rubber forming the transmission belt decreases, resulting in decreases in bending fatigue resistance and adhesion.

Examples of resorcin compounds used for the adhesive treatment agent include pre-oligomerized resorcin-formalin initial condensates and polynuclear chlorophenol-based resorcin-formalin initial condensates prepared by oligomerizing chlorophenol, resorcin, and formalin. They may be used alone or in combination as necessary.

In addition, it is also preferable that a crosslinking agent is used together with this adhesive treatment agent. Examples of preferred crosslinking agents to be added include amines, ethylene urea, and blocked polyisocyanate compounds. Considering the temporal stability of the treatment agent, the interaction with the pre-treatment agent, and the like, it is preferable to use a blocked polyisocyanate compound.

It is preferable that the proportion of a crosslinking agent, such as a blocked polyisocyanate, added to this adhesive treatment agent is within a range of 0.5 to 40 wt %, preferably 10 to 30 wt %, relative to the resorcin-formalin-rubber latex (RFL). An increase in the amount added usually improves the adhesion strength. Meanwhile, when the amount added is too large, conversely, there is a tendency that the compatibility of the adhesive with rubbers decreases, resulting in a decrease in adhesion strength to rubbers.

Further, it is preferable that the fiber cord for reinforcement of the invention does not contain an organic solvent. When an organic solvent is not contained, the environment is not adversely affected, and it has also become possible to prevent the degradation of performance with time. Such a fiber cord for reinforcement can be obtained using, for example, not an organic-solvent-based treatment liquid but a water-based treatment liquid.

Like this, in the fiber cord for reinforcement of the invention, the adhesive treatment agent is attached to the surface of the fiber cord, and the compound $A_1$ and the compound $B_1$ are contained in the inner layer part of the fiber cord. Then, in the fiber cord for reinforcement of the invention, it is preferable that the compound $A_1$ is not present in the surface of the fiber cord, but is located only in the inner layer part of the fiber cor. When the compound $A_1$ is located only in the fiber cord inner layer part, there is a tendency that the adhesion inside the fiber cord is improved, whereby the bundling properties are likely to be further improved. This effect is particularly prominent in the case where an epoxy compound is present inside the fiber bundle, which is considered to be attributable to the affinity between the epoxy compound and the compound $A_1$. In addition, it is preferable that a compound having a hexamethylene diisocyanate (HDI) trimer structure is present in the inner layer part of the fiber cord, and no latex is present in the inner layer part of the fiber cord. The presence of a latex in the fiber cord inner layer part inhibits the affinity between the compound $A_1$ and epoxy and thus is undesirable. In addition, it is preferable that the compound $B_1$ is unevenly located in the fiber cord inner layer part. This is because the presence of the compound $B_1$ weakens the interaction between the latex and the compound $A_1$. In the invention, because of such a configuration of the inner layer part, moderate joining can be maintained between fiber filaments in the fiber cord inner layer, and further the fraying resistance can be improved.

In addition, such a fiber cord for reinforcement of the invention can be obtained by a method for producing a fiber cord for reinforcement, which is another embodiment of the invention. That is, the fiber cord for reinforcement of the invention can be obtained by a method for producing a fiber cord for reinforcement, including treating a fiber cord in two stages with a pre-treatment liquid and an adhesive treatment liquid. The pre-treatment liquid contains two kinds of blocked isocyanate compounds, that is, a compound $A_2$ and a smaller amount of a blocked isocyanate compound $B_2$. The compound $A_2$ has an isocyanate group blocked with an aromatic compound or a compound containing an α-dicarboxylic acid component, and the compound $B_2$ has an isocyanate group blocked with an aliphatic compound or an alicyclic compound. A fiber cord having the pre-treatment liquid attached thereto is once subjected to a heat treatment, and then the adhesive treatment liquid is attached thereto, followed by a drying treatment.

The fiber forming the fiber cord used for the method of the invention should be, as described above, a fibrous material for reinforcing the matrix of a structure. Synthetic fibers are particularly preferable.

In addition, with respect to the configuration of the fiber cord for reinforcement of the invention, as described above, it is preferable that fiber cord is a single yarn or an assembly of several yarns. It is also preferable that the fiber has been previously treated with an epoxy resin, a urethane resin, or the like in the stage of yarn-making or after yarn making. Further, it is preferable that the fiber cord is a twisted cord. As described above, it is preferable that the fiber cord is obtained by aligning and twisting one or more fiber yarns (first twisting) and then aligning and twisting two or more such twisted yarns (second twisting).

The method for producing a fiber cord for reinforcement of the invention is a method in which, first, such a fiber cord is treated with a pre-treatment liquid. Here, the pre-treatment liquid contains a blocked isocyanate compound $A_2$ (hereinafter sometimes referred to as compound $A_2$) and a blocked isocyanate compound $B_2$ (hereinafter sometimes referred to as compound $B_2$), and the content of the compound $A_2$ is lower than the content of the compound $B_2$. Further, here, it is preferable that the isocyanate group unblocking temperature of the compound $A_2$ is lower than the isocyanate group unblocking temperature of the compound $B_2$.

Here, a blocked polyisocyanate compound used in the method of the invention is an addition reaction product between a polyisocyanate compound and a blocking agent, which is the isocyanate protecting group. When heated, the blocked polyisocyanate compound releases the block component to produce an active polyisocyanate compound. In particular, a polyisocyanate containing terminal isocyanate groups obtained by a reaction between isocyanate groups (—NCO) and hydroxyl groups (—OH) in a molar ratio of more than 1 exerts excellent performance and thus is preferable. Examples of blocking agents include phenols such as phenol, thiophenol, cresol, and resorcinol, aromatic secondary amines such as diphenylamine and xylidine, heterocyclic compounds such as dimethylpyrazole, α-dicarboxylic acids such as diethyl malonic acid, phthalic imides, lactams such as caprolactam and valerolactam, aliphatic compounds such as acidic sodium sulfite, phenols such as phenol, thiophenol, cresol, and resorcinol, aromatic secondary amines such as diphenylamine and xylidine, phthalic imides, lactams such as caprolactam and valerolactam, oximes such as acetoxime, methylethylketoxime, and cyclohexanone oxime, and acidic sodium sulfite.

Then, the blocked polyisocyanate compounds used in the method for producing a fiber cord for reinforcement of the invention include both of the blocked polyisocyanate compound $A_2$ blocked with an aromatic compound or a compound containing an α-dicarboxylic acid component and the blocked polyisocyanate compounds $B_2$ blocked with an aliphatic compound or an alicyclic compound. It is still more preferable that the isocyanate group unblocking temperature of the compound $A_2$ is lower than the isocyanate group unblocking temperature of the compound $B_2$. Further, it is preferable that the unblocking temperature of the compound $A_2$ is less than 160° C., particularly within a range of 100 to 150° C. Meanwhile, it is preferable that the unblocking temperature of the compound $B_2$ is 160° C. or more, particularly within a range of 160 to 200° C. In addition, it is preferable that the abundance of the compound $A_2$ is higher than the abundance of the compound $B_2$, and further it is preferable that the solids weight ratio of compound $A_2$/compound $B_2$ is 99/1 to 60/40.

Here, an unblocking temperature refers to a temperature at which the blocking group is released from a blocked isocyanate by heat, whereby the isocyanate activity is developed. As preferred conditions for the method of the invention, first, through the first-stage heat treatment, the blocked polyisocyanate compound $A_2$ blocked with an aromatic compound or a compound containing an α-dicarboxylic acid component is unblocked and crosslinked. Then, through the subsequent second-stage heat treatment, the blocked polyisocyanate compound $B_2$ is unblocked, and the compound-$B_2$-derived compound is crosslinked with the crosslinked isocyanate derived from the compound $A_2$. Further, it is preferable that the first-stage heat treatment is a low-temperature heat treatment, and the second-stage heat treatment is a high-temperature heat treatment. In the method of the invention, crosslinking is performed in two stages like this, whereby a tough, dense film of the pre-treatment liquid (first bath adhesive) can be formed inside and on the surface of the fiber cord. Accordingly, the fiber cord can be provided with enhanced fraying resistance, bending fatigue resistance, and adhesion. In particular, the obtained fiber cord is optimal for rubber reinforcement applications, particularly for use as a cord for a transmission belt.

Here, with respect to the difference in unblocking temperature between the compound $A_2$ and the compound $B_2$, the greater the better. It is preferable that the difference in unblocking temperature between the compounds $A_2$ and $B_2$ [=(unblocking temperature of the compound $B_2$)−(unblocking temperature of the compound $A_2$)] is 30° C. or more. When the temperature difference is sufficient, the two-stage isocyanate crosslinking reaction can take place more easily. When the temperature difference is too small, this results in a competing reaction, in which the crosslinking reactions of the compound $A_2$ and the compound $B_2$ take place at the same time. As a result, it tends to be difficult to control the crosslinked structure. In addition, this is likely to expose the difference in the strength of the pre-treatment liquid film between the inner and outer layers of the fiber cord due to the difference in heat distribution. In such a case, the fraying resistance and bending fatigue resistance tend to decrease. More specifically, as unblocking temperatures, it is preferable that the unblocking temperature of the compound $A_2$ is 110 to 130° C., and the unblocking temperature of the compound $B_2$ is 160° C. to 180° C.

The compound $A_2$ used in the method of the invention is the above compound $A_2$ and has an isocyanate group blocked with an aromatic compound or a compound containing an α-dicarboxylic acid component. Further, as the aromatic compound, a heterocyclic compound having a cyclic structure containing nitrogen or like atoms in addition to carbon atoms is preferable, and it is particularly preferable that the aromatic compound is a heterocyclic aromatic compound such as dimethylpyrazole (DMP). As the compound containing an α-dicarboxylic acid component, a compound blocked with diethyl malonate is preferable. Such a compound $A_2$ is prone to having a resonance structure, allowing for unblocking at a lower temperature.

In addition, the compound $B_2$ used in the method of the invention is the above compound $B_2$ and has an isocyanate group blocked with an aliphatic compound or an alicyclic compound. More specifically, those blocked with an oxime such as methylethylketoxime or a lactam such as ε-caprolactam are preferable.

In addition, the unblocking temperature is significantly affected by the block-forming compound structure. In the method of the invention, it is particularly preferable that the block structure of the compound $A_2$ is a dimethylpyrazole (DMP) block structure, and the block structure of the compound $B_2$ is an ε-caprolactam block structure.

In addition, in the invention, it is preferable that the blocked polyisocyanate compound $A_2$ is composed of a compound having a hexamethylene diisocyanate (HDI) trimer structure represented by the following chemical structural formula (I).

[Chemical Formula 3]

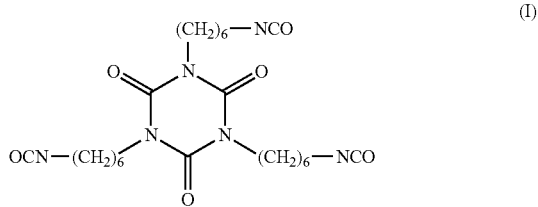

(I)

As shown in the above chemical structural formula (I), this blocked polyisocyanate compound is a compound having, as its basic structure, a trimer structure in which three terminal NCO groups of the hexamethylene diisocyanate (HDI) form a cyclic structure. It is also preferable that each trimer structure is, as shown in the following chemical structural formula (II), for example, a condensed compound having further increased functionality. Here, R of chemical structural formula (II) can be selected from polyglycols, such as polyethylene glycol, without impairing the affinity for water and heat resistance.

[Chemical Formula 4]

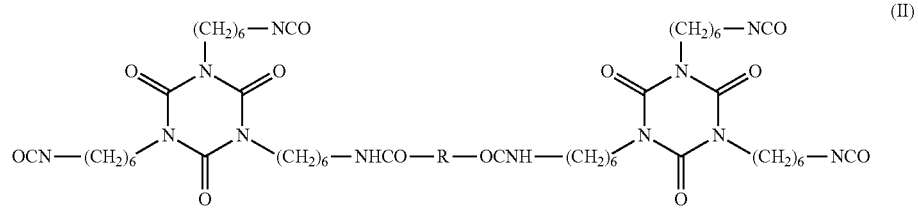

(II)

In addition, in the invention, it is preferable that the blocked isocyanate compound $A_2$ is such that the number of functional groups present in the molecule after unblocking is three or more. In the case where the number of functional groups is two or less, the crosslinking reactivity with the pre-treatment liquid and the reactivity to the adhesive treatment liquid tend to be insufficient. In particular, in the case where the fiber cord for reinforcement of the invention is used for rubber reinforcement, such as a belt core material, a resorcin-formalin-latex (RFL)-based adhesive is usually used as the adhesive treatment liquid; however, there is a tendency that with the small amount of resorcinol-derived hydroxyl groups contained in RFL alone, the reactivity is likely to be insufficient.

Meanwhile, as the blocked polyisocyanate compound $B_2$, an ε-caprolactam-blocked diphenylmethane diisocyanate (MDI) compound is particularly preferable. In the invention, an epoxy compound and a flexible blocked polyisocyanate compound $A_2$ are crosslinked through the first-stage heat treatment, and then a blocked polyisocyanate compound $B_2$ having a rigid MDI structure is further crosslinked through the second-stage heat treatment. As a result, a pre-treatment liquid film, which is particularly firm, dense, and also flexible, is formed inside and also on the surface layer of the fiber cord. Then, it has become possible to achieve significant improvements in fraying resistance, bending fatigue resistance, and adhesion, which have been difficult to achieve by the conventional aqueous adhesive treatment.

In addition, in the method for producing a fiber cord for reinforcement of the invention, it is preferable that the pre-treatment liquid contains an epoxy compound in addition to the above two kinds of blocked isocyanate compounds.

Here, as the epoxy compound used in the invention, a compound having at least two epoxy groups in one molecule is preferable. In particular, a compound containing at least 2 g equivalents of epoxy groups per kg of compound is preferable. More specifically, examples thereof include reaction products between a polyalcohol such as ethylene glycol, glycerol, sorbitol, pentaerythritol, or polyethylene glycol and a halogen-containing epoxide such as epichlorohydrin; reaction products between a polyphenol such as resorcin, bis(4-hydroxyphenyl)dimethylmethane, a phenol-formaldehyde resin, or a resorcin-formaldehyde resin and a halogen-containing epoxide as described above; and polyepoxide compounds prepared by oxidizing an unsaturated compound with peracetic acid, hydrogen peroxide, or the like, that is, 3,4-epoxycyclohexene epoxide, 3,4-epoxycyclohexylmethyl-3,4-epoxycyclohexene carboxylate, bis(3,4-epoxy-6-methylcyclohexylmethyl)adipate, and the like. Among them, a reaction product between a polyalcohol and epichlorohydrin, that is, a polyglycidyl ether compound of a polyalcohol, develops excellent performance and thus is particularly preferable.

In addition, it is also preferable that latexes and like components are used with and contained in the pre-treatment liquid used in the invention.

In addition, in the method of the invention, it is preferable that the fiber cord is a fiber cord including a twisted fiber. When the fiber cord is twisted, the pre-treatment liquid penetrates into the fiber cord more effectively. In addition, it is preferable that the pre-treatment liquid also contains an epoxy compound in addition to the two kinds of blocked polyisocyanate compounds. When an epoxy compound is used together with the two kinds of blocked polyisocyanate compounds, the effect of the unblocking temperature difference between the two kinds of blocked isocyanate compounds is exerted more clearly.

The blocked polyisocyanate compounds used in the invention have high affinity for the fiber-forming polymer and have excellent penetration and cohesive strength. Further, in order to promote the adhesion to the fiber surface and the polyisocyanate crosslinking reaction and obtain a firm adhesive film, it is preferable to use an epoxy compound together. Further, in the case where an epoxy compound is used together with the pre-treatment liquid of the invention like this, it is preferable that the epoxy compound is used such that the solids weight ratio of epoxy compound/blocked polyisocyanate compounds is 5/95 to 30/70, more preferably 10/90 to 25/75, particularly 15/85 to 25/75.

In the case where an epoxy compound is used together, in the stage where water is distilled from the attached fiber and a heat treatment is performed, the epoxy compound and the blocked polyisocyanate compounds are thermally diffused into the fiber cord over a sufficient period of time, and then the two kinds of blocking agents are released, causing a crosslinking reaction. As a result, high interface reinforceability is obtained. At the time of this thermal diffusion, it is preferable that the epoxy compound and the blocked polyisocyanate compounds are low-molecular-weight components having high reaction activity. Accordingly, it is preferable that the pre-treatment liquid does not contain a hydroxyl group or alkali component which crosslinks the epoxy compound or blocked polyisocyanate compounds or deactivates them with water.

Here, with respect to the solids weight ratio of epoxy compound/blocked polyisocyanate compounds, in the case where the compositional proportion of epoxy is too low, the curing reaction rate of the isocyanate compounds tends to decrease. Thus, a firm crosslinked film is less likely to be obtained, and the fraying resistance is less likely to be improved. Meanwhile, in the case where the compositional proportion of the epoxy compound is excessive, the crosslinked film tends to be hard and brittle. Accordingly, the bending fatigue resistance and durability are less likely to be improved.

In the invention, in the case where the above epoxy compound and blocked isocyanate compounds are used together, it is preferable that the pre-treatment liquid (first adhesive treatment agent) is a water dispersion. Specifically, it is preferable to use a water dispersion containing them at a solids concentration of 2 to 20 wt %, more preferably 5 to 15 wt %, at the time of application to the fiber.

In the method of the invention, for the application of such a water dispersion (pre-treatment liquid) to the fiber, it is possible to employ techniques such as contact with a roller, application by spraying from a nozzle, or immersion in a solution. In addition, it is preferable that the amount of solids of the pre-treatment liquid attached to the fiber is within a range of 0.5 to 5.0 wt %. When the amount attached is too small, the filaments forming the fiber cord cannot be sufficiently bundled, resulting in a decrease in fraying resistance. In particular, in the case where the fiber cord for reinforcement of the invention is used as a belt core material, it tends to be difficult to obtain a sufficient and uniform pre-treatment liquid film for protecting the fiber interface from rubber vulcanization at the time of shaping a belt or aminolysis at the time of using the belt. Meanwhile, in the case where the amount attached is too large, there is a tendency that gumming-up or the like occurs in the subsequent adhesive treatment step or shaping step, resulting in a decrease in process passing properties. Therefore, it is preferable that the amount of solids of the pre-treatment liquid attached to the fiber is 0.5 to 5.0 wt %, still more preferably 1.0 to 3.0 wt %. The amount of solids attached can be controlled by techniques such as squeezing with a pressure-welding roller, scraping off with a scraper or the like, blowing off by air blowing, suction, or a beater. In order to increase the amount attached, attachment may be performed several times.

In the method of the invention, the pre-treatment liquid is applied to the fiber cord, followed by a heat treatment. Here, as preferred heat treatment conditions, two-stage heating is preferable. Specifically, for example, it is preferable that drying is performed at a temperature of 80 to 150° C. for 60 to 120 seconds, and then a heat treatment is performed at a temperature of 180 to 240° C. for 60 to 180 seconds.

That is, first, through the first-stage heat treatment, moisture on the cord surface and inside the cord is distilled off, and the pre-treatment liquid containing blocked polyisocyanate compounds are thermally diffused into the fiber cord at the same time. In the case where the treatment condition is such that the temperature is low or the time is short, moisture tends to remain not-distilled off. Accordingly, there is a tendency that the isocyanate compounds and the like are deactivated in the subsequent high-temperature heat treatment, making it impossible to obtain a firm crosslinked film. On the other hand, in the case where the first-stage heat treatment is a high-temperature treatment, the crosslinking reaction of the isocyanate compounds and the like takes place as a competing reaction with hydrolysis, and thus the film tends to be brittle. Further, there is a tendency that the remaining moisture in the fiber cord undergoes bumping, whereby the penetration of the pre-treatment liquid (first adhesive treatment agent) into the fiber cord is inhibited. In addition, in the case where the heat treatment time is long, there is a tendency that the isocyanate compounds are air-oxidized, and the film performance decreases. As the conditions for the first-stage heat treatment, it is more preferable that the treatment is performed at a temperature of 90 to 120° C. for 60 to 120 seconds.

It is preferable that following this first-stage heat treatment (drying heat treatment), a second-stage heat treatment is performed at a temperature of 180 to 240° C. for 60 to 180 seconds. As a result, the crosslinking reaction takes place in the state where moisture has been sufficiently distilled from the fiber cord and the blocked polyisocyanate compounds and the like have uniformly permeated into the fiber cord. In the case of a low-temperature treatment or a short-time treatment, there is a tendency that the crosslinking reaction does not sufficiently progress, and the film is likely to be brittle. On the other hand, in the case of a high-temperature treatment or a long-time treatment, there is a tendency that the isocyanate compounds and the like are pyrolyzed or air-oxidized, making it difficult to exert the performance. As the conditions for the second-stage heat treatment, it is more preferable that the treatment is performed at a temperature of 200 to 235° C. for 60 to 120 seconds.

In the method for producing a fiber cord for reinforcement of the invention, as described above, a pre-treatment liquid (first adhesive treatment agent) is attached to the fiber cord, then the fiber cord having attached thereto the pre-treatment liquid is once heat-treated, and subsequently an adhesive treatment liquid is attached thereto, followed by a drying treatment.

Here, the adhesive treatment liquid is to be suitably changed according to the matrix for which the fiber cord for reinforcement of the invention is used. For example, in the case where the fiber cord is used for a rubber structure such as a belt, it is preferable to use a resorcin-formalin-latex (RFL)-based adhesive as the adhesive treatment liquid (second adhesive treatment agent).

This RFL-based adhesive has the above composition. Those having a resorcin/formaldehyde molar ratio within a range of 1/0.6 to 1/8 are preferably used, and various latexes are usable.

In addition, it is also preferable that a crosslinking agent is used together with this resorcin-formalin-latex (RFL)-based adhesive treatment agent to serve as a treatment agent, and examples thereof include amines, ethylene urea, and blocked polyisocyanate compounds. Among them, considering the temporal stability of the treatment agent, the interaction with the pre-treatment agent, and the like, it is preferable to use a blocked polyisocyanate compound. It is preferable that the proportion of the crosslinking agent added is within a range of 0.5 to 40 wt % relative to the RFL component. This is because although an increase in the amount added usually improves the adhesion strength, when the amount added is too large, conversely, there is a tendency that the compatibility of the adhesive with rubbers decreases, resulting in a decrease in adhesion strength to rubbers.

In the invention, it is preferable that an adhesive liquid (second adhesive treatment agent) is used as a treatment liquid composed of a water dispersion, and that the total solids concentration of the water dispersion is within a range of 5 to 30 wt %. In the case where the total solids concentration of the treatment liquid is lower than the above range, the surface tension of the adhesive increases, and the adhesion to the fiber surface becomes less uniform. At the same time, with a decrease in the amount of solids attached, the adhesion tends to decrease. On the other hand, in the case where the total solids concentration is higher than the above range, the viscosity of the treatment agent increases. Thus, there is a tendency that the amount of solids attached becomes too large, resulting in a decrease in process passing properties, such as gumming-up in the adhesive treatment step or shaping step.

In order to attach the adhesive treatment liquid (second adhesive treatment agent) to the fiber like this, it is possible to employ techniques such as contact with a roller, application by spraying from a nozzle, or immersion in a solution. In addition, it is preferable that the amount of solids attached to the fiber cord is within a range of 1.0 to 10.0 wt %, still more preferably within a range of 1.5 to 8.0 wt %. The amount of solids attached to the fiber cord can be controlled, similarly to the above, by techniques such as squeezing with a pressure-welding roller, scraping off with a scraper or the like, blowing off by air blowing, suction, or a beater. In order to increase the amount attached, attachment may be performed several times.

In the method of the invention, the adhesive treatment liquid is attached to the fiber cord and dried. As the heat treatment conditions for drying, it is preferable that the drying heat treatment is performed in two or more stages at a temperature of 100° C. to 250° C. for 60 to 240 seconds. It is more preferable that drying is performed in a temperature range of 120 to 180° C. for 60 to 180 seconds, and then a heat treatment is performed at a temperature of 200 to 245° C. for 60 to 180 seconds. When this drying/heat treatment temperatures are too low, the adhesion to rubbers tends to be insufficient, while when the drying/heat treatment temperatures are too high, there is tendency that the air oxidation of the adhesive components at high temperatures is promoted, resulting in a decrease in adhesion activity.

In the method for producing a fiber cord for reinforcement of the invention, unlike the conventional solvent treatments, the organic-solvent-based adhesive treatment formulation using an isocyanate compound having free isocyanate groups is not employed. Accordingly, this production method is safe for the working environment and has a reduced environmental impact. Then, a pre-treatment liquid that easily penetrates into the fiber cord is applied preferably as a water-based adhesive treatment agent, that is, a water dispersion, and two kinds of blocked polyisocyanate compounds are successively unblocked, thereby causing a curing reaction while suppressing deactivation, whereby a firm, flexible crosslinked film is formed. The invention enhances the interface adhesion strength between the fiber surface layer and the fiber inner layer impregnated with the pre-treatment liquid (first adhesive treatment agent layer), as well as between the fiber inner layer (first adhesive treatment agent layer) and the adhesive layer (second adhesive treatment agent layer). As a result, it has become possible to achieve improvements in both fraying resistance and bending fatigue resistance, while ensuring high adhesion.

EXAMPLES

Hereinafter, the invention will be described with reference to examples. However, these examples are provided by way of illustration and do not limit the invention. Incidentally, evaluations in the examples of the invention were made according to the following measurement methods.
(1) Measurement of Compound Proportions in Fiber Cord Inner Layer Part (Pyrolysis GC-MS)

From an obtained fiber cord for reinforcement, the adhesive layer (outermost layer part) was peeled off to give a fiber cord having fibers exposed to the surface. Further, the outside quarter of the fiber cord was trimmed off. From the inner layer part whose diameter is 75% of the original fiber cord diameter, a measurement sample weighing 5 mg was collected.

Using this sample, the compound proportions (weight ratio) were determined from the peak areas of the compound $A_1$ and the compound $B_1$ by a cut & weight method using a pyrolyzer (manufactured by Japan Analytical Industry Co., Ltd., Curie Point Pyrolyzer "CCP JHP-5") and a gas chromatograph mass spectrometer (manufactured by Shimadzu Corporation Co., Ltd., "GC-MS QP2010").
(Measurement Conditions)
CCP (Pyrolyzer)

Oven temperature; 250° C., Needle temperature; 250° C., Sample heating; 590° C.×15 sec
GC (Gas Chromatograph)

Vaporizing chamber temperature; 250° C., Column; DB-5 ms, Split ratio; 1/100,

Column open program; 60° C.×2 min, heated at a temperature rise rate of 10° C./min to 180° C. or 320° C.
MS (Mass Spectrometer)

Ion source temperature; 200° C., Interface temperature; 250° C., Mass range; 29 to 600
(2) Unblocking Temperature of Blocked Polyisocyanate Using a thermobalance (TG/DTA, manufactured by Rigaku International Corporation, "TAS-200"), 10 mg of a blocked polyisocyanate, from which water had been distilled, was heated in a nitrogen atmosphere from room temperature at a temperature rise rate of 10° C./min. The temperature at which the weight of the sample was reduced by 10 wt % was defined as the unblocking temperature.
(3) Tensile Strength, Breaking Elongation, 150-N Load Elongation (Intermediate Elongation), and 150° C. Dry Heat Shrinkage of Cord Each was determined by measurement in accordance with JIS L1017.

(4) Cord Hardness

Measurement was performed using a Gurley hardness tester (manufactured by Tester Sangyo Co., Ltd.) in accordance with JIS L1096-6.20.
(5) Peel Adhesion of Cord This shows the peel adhesion between an adhesive-treated fiber cord and a rubber. Seven cords were embedded in the surface layer of a sulfur-based EPDM rubber unvulcanized sheet, followed by vulcanization at a temperature of 150° C. for 30 minutes under a pressing pressure of 90 kg/cm². Next, every other one of the cords from both ends, four cords in total, were removed, and the remaining three cords were simultaneously peeled from the rubber sheet at a rate of 200 mm/min. The forces required for peeling (N/3 cords) were averaged to determine the peel adhesion per cord (N/cord).
(6) Bending Fatigue Resistance and Fraying Resistance of Cord Eight adhesive-treated fiber cords were embedded at regular intervals in two unvulcanized rubber sheets of sulfur-based EPDM rubber (50 mm in width, 500 mm in length, and 2 mm in thickness), followed by vulcanization at a temperature of 150° C. for 30 minutes under a pressing pressure of 50 kg/cm², thereby giving a belt-like rubber shaped article. Next, while applying a load of 30 kg, the belt-like rubber shaped article was installed on a roller 20 mm in diameter, and subjected to back-and-forth movements at 100 rpm in an atmosphere at 100° C. for a roller bending (contact) distance of 100 mm. After repeating bending 10,000 times, the cords were taken out, and the remaining strength was measured to determine the strength retention after bending fatigue. In addition, after the bending fatigue, the belt-like rubber shaped body was cut in the direction perpendicular to the embedded fiber cords, and the bundling conditions of the fiber cords exposed to the cross-section were observed visually and also under an optical microscope to evaluate fraying resistance. The fraying resistance was rated in the following three grades.
[Fraying Resistance (after Bending Fatigue Test)]

5: The filaments of the fiber cords are bundled, and no abnormalities are seen in the appearance; excellent. 3: Some filaments of the fiber cords have slight bundling failures; however, good.

1: The filaments of the fiber cords have bundling failures and are not bundled.

Example 1

To 22.8 g of a polyepoxide compound having a sorbitol polyglycidyl ether structure ("Denacol EX-614B" manufactured by Nagase ChemteX Corporation; concentration: 100%) was added 8.8 g of an aqueous dialkyl sulfosuccinate sodium salt solution ("Neocol SW-C" manufactured by DKS Co., Ltd.; concentration: 70%) as a surfactant, followed by stirring, and the mixture was added to 723.7 g of water with stirring and dissolved. Then, 226.5 g of a dimethylpyrazole block-HDI trimmer condensate having three or more functional groups ("Trixene 327" manufactured by Baxenden (UK); unblocking temperature: 115° C., concentration: 38%) as a blocked polyisocyanate compound $A_2$ (shows as "a" in Table 1) and 18.2 g of a bifunctional ε-caprolactam-blocked diphenylmethanediisocyanate ("GRILBOND IL-6" manufactured by EMS; unblocking temperature: 170° C., concentration: 50%) as a blocked polyisocyanate compound $B_2$ (shown as "b" in Table 1) were added thereto with stirring, thereby preparing a pre-treatment liquid (water dispersion of a first adhesive treatment agent, solids concentration: 12%), wherein the solids weight ratio of epoxy compound/blocked polyisocyanate compounds (the total of the blocked polyisocyanate compound $A_2$ and the blocked polyisocyanate compound $B_2$) was 20/80, and the solids weight ratio of blocked polyisocyanate compound $A_2$/blocked polyisocyanate compound $B_2$ was 90/10.

19.8 g of a resorcin-formalin initial condensate having a resorcin/formalin (R/F) molar ratio of 1/0.6 ("Sumikanol 700S" manufactured by Sumitomo Chemical Co., Ltd.; concentration: 65%) was dissolved in an aqueous alkali solution prepared by adding 5.0 g of 10% caustic soda and 19.9 g of 20% ammonia water to 154.5 g of water, and then 138.3 g of a vinylpyridine-styrene-butadiene latex ("Pyratex" manufactured by Nippon A&L Inc.; concentration: 41%), 206.2 g of a polybutadiene latex ("Nippol LX111NF" manufactured by Zeon Corporation; concentration: 55%), and 363.6 g of water were added thereto. 16.8 g of 37% formalin water and 75.9 g of a methylethylketoxime-blocked diphenylmethane diisocyanate ("DM6400" manufactured by Meisei Chemical Works, Ltd.; concentration: 40%) were added to this mixture, followed by aging at 20° C. for 48 hours, thereby preparing an adhesive treatment liquid having a solids concentration of 22% (RFL-based second adhesive treatment agent for second treatment bath).

Two polyethylene terephthalate untreated fibers of 1,100 dtex/192 fil ("P904B" manufactured by Teijin Fibers) were first-twisted in the S-direction (number of twists: 220/m), and then three of the first-twisted cords were second-twisted in the Z-direction (number of twists: 120/m), thereby giving a polyester fiber cord. Using Computreater (dip cord treater manufactured by C.A. Litzler), this fiber cord was fed at a rate of 22 m/min and immersed in the pre-treatment liquid (first adhesive treatment agent), then dried at a fixed length at 120° C. for 60 seconds, and heat-treated at a fixed length at 235° C. for 60 seconds. Subsequently, the cord was immersed in the adhesive treatment liquid (second treatment bath), then dried at a fixed length at 160° C. for 120 seconds, and heat-treated under 3.5% stretching conditions at 230° C. for 150 seconds, thereby giving a polyester (polyethylene terephthalate) adhesive-treated fiber cord. This adhesive-treated fiber cord had attached thereto the pre-treatment liquid (first-bath adhesive treatment agent) and adhesive treatment liquid (second-bath adhesive treatment agent) in amounts of 2.6 wt % and 4.8 wt %, respectively, relative to the weight of the polyester fiber cord on a solids basis.

The compound proportions in the inner layer part of the obtained fiber cord were measured (pyrolysis GC-MS). As a result, the ratio of the compound $A_1$ derived from dimethylpyrazole (DMP) and the compound $B_1$ derived from ε-caprolactam were as follows: $A_1/B_1=80/20$. The performance evaluation results of the obtained fiber cord are collectively shown in Table 1.

Examples 2, 3, and 4, Comparative Example 1

Polyester fiber cords were subjected to an adhesive treatment in the same manner as in Example 1, except that the solids weight ratio of blocked polyisocyanate compound $A_2$/blocked polyisocyanate compound $B_2$ in the pre-treatment liquid (first adhesive treatment agent) of 90/10 in Example 1 was changed as shown in Table 1 in preparation. The performance evaluation results of the obtained polyester adhesive-treated fiber cords are collectively shown in Table 1.

Comparative Example 2

A polyester fiber cord was subjected to an adhesive treatment in the same manner as in Example 1, except that in the pre-treatment liquid (first adhesive treatment agent), only the blocked polyisocyanate compound $A_2$ was used, and the blocked polyisocyanate compound $B_2$ was not used. The performance evaluation results of the obtained polyester adhesive-treated fiber cord are collectively shown in Table 1.

TABLE 1

| | | Example 1 | Example 2 | Example 3 | Example 4 | Comparative Example 1 | Comparative Example 2 |
|---|---|---|---|---|---|---|---|
| Pre-Treatment Liquid | Compound $A_2$ | a | a | a | a | — | a |
| | Compound $B_2$ | b | b | b | b | b | — |
| | $A_2/B_2$ Ratio | 90/10 | 99/1 | 70/30 | 50/50 | 0/100 | 100/0 |
| Physical Properties of Fiber Cord for Reinforcement | Compound $A_1$/Compound $B_1$ Ratio | 80/20 | 94/6 | 65/35 | 55/45 | 0/100 | 100/0 |
| | Strength (N) | 380 | 382 | 389 | 381 | 392 | 386 |
| | Breaking Elongation (%) | 19.2 | 19.1 | 20.0 | 20.8 | 22.6 | 23.1 |
| | 150-N Load Elongation (%) | 8.5 | 8.5 | 8.6 | 8.7 | 9.5 | 8.6 |
| | 150° C. Dry Heat Shrinkage (%) | 2.1 | 2.1 | 2.1 | 2.1 | 1.9 | 1.9 |
| | Cord Hardness (mg) | 44,800 | 28,100 | 36,200 | 28,500 | 21,600 | 30,600 |
| | Peel Adhesion (N/cord) | 29.4 | 26.9 | 27.8 | 23.5 | 22.7 | 24.2 |
| | Strength Retention after Bending Fatigue (%) | 94 | 96 | 92 | 84 | 79 | 71 |
| | Fraying Resistance | 5 | 5 | 5 | 3 | 1 | 1 | a; Dimethylpyrazole block-HDI trimmer condensate
b; ε-Caprolactam-blocked diphenylmethane diisocyanate Examples 5, 6, and 7

Polyester fiber cords were subjected to an adhesive treatment in the same manner as in Example 1, except that the solids weight ratio of epoxy compound/blocked polyisocyanate compounds (total amount) in the pre-treatment liquid (first adhesive treatment agent) of 20/80 in Example 1 was changed as shown in Table 2 in preparation. The performance evaluation results of the obtained polyester adhesive-treated fiber cords are collectively shown in Table 2.

Example 8

A polyester fiber cord was subjected to an adhesive treatment in the same manner as in Example 1, except that in the pre-treatment liquid (first adhesive treatment agent), the blocked polyisocyanate compound $A_2$ was changed from the dimethylpyrazole block-HDI trimmer condensate used in Example 1 to a diethyl malonate-HDI trimmer condensate having three or more functional groups (unblocking temperature: 120° C., concentration: 25%) (shown as "a'" in Table 2). The performance evaluation results of the obtained polyester adhesive-treated fiber cord are collectively shown in Table 2.

Example 9

A polyester fiber cord was subjected to an adhesive treatment in the same manner as in Example 1, except that in the adhesive treatment liquid (RFL-based second adhesive treatment agent for second treatment bath), 138.3 g of VpSBR (concentration: 41%) in the vinylpyridine-styrene-butadiene latex (VpSBR) and polybutadiene latex (PB) in Example 1 was replaced with 127.5 g of a chlorosulfonated polyethylene (CSM) latex (Sepolex CSM, manufactured by Sumitomo Seika Chemicals Co., Ltd.; concentration: 40%) (L1). The performance evaluation results of the obtained polyester adhesive-treated fiber cord are collectively shown in Table 2.

pound $B_2$ was used as a blocked isocyanate compound. As a result, the cord hardness, fraying resistance, adhesion, and bending fatigue resistance were all lower as compared with the examples.

INDUSTRIAL APPLICABILITY

According to the invention, a fiber cord for reinforcement having significantly improved fraying resistance and being excellent in adhesion to rubbers, bending fatigue resistance, and durability is obtained. In particular, the fiber cord for reinforcement of the invention is suitable for rubber reinforcement, particularly as a transmission belt cord. The fiber cord is particularly optimal for automobiles, where weight reduction is required. In addition, in the method of the invention, water-based adhesive treatments can also be employed. Thus, as an environment-conscious method for

TABLE 2

| | | Example 1 | Example 5 | Example 6 | Example 7 | Example 8 | Example 9 |
|---|---|---|---|---|---|---|---|
| Pre-Treatment Liquid | Compound $A_2$ | a | a | a | a | a' | a |
| | Compound $B_2$ | b | b | b | b | b | b |
| | $A_2/B_2$ Ratio | 90/10 | 90/10 | 90/10 | 90/10 | 90/10 | 90/10 |
| | Epoxy/($A_2 + B_2$) Ratio | 20/80 | 10/90 | 5/95 | 30/70 | 20/80 | 20/80 |
| Adhesive Treatment Liquid | Latex Component | Vp/BP | Vp/BP | Vp/BP | Vp/BP | Vp/BP | CSM/BP |
| Physical Properties of Fiber Cord for Reinforcement | Compound $A_1$/Compound $B_1$ Ratio | 80/20 | 80/20 | 80/20 | 80/20 | 80/20 | 80/20 |
| | Strength (N) | 380 | 386 | 375 | 381 | 381 | 382 |
| | Breaking Elongation (%) | 19.2 | 19.7 | 18.7 | 19.0 | 18.4 | 19.1 |
| | 150-N Load Elongation (%) | 8.5 | 8.5 | 8.4 | 8.3 | 8.2 | 8.5 |
| | 150° C. Dry Heat Shrinkage (%) | 2.1 | 2.1 | 2.1 | 2.2 | 2.2 | 2.0 |
| | Cord Hardness (mg) | 44,800 | 41,500 | 38,100 | 40,800 | 40,800 | 44,100 |
| | Peel Adhesion (N/cord) | 29.4 | 28.3 | 26.0 | 26.4 | 27.9 | 29.2 |
| | Strength Retention after Bending Fatigue (%) | 94 | 93 | 96 | 80 | 92 | 95 |
| | Fraying Resistance | 5 | 5 | 5 | 5 | 5 | 5 | a; Dimethylpyrazole block-HDI trimmer condensate
a'; Diethyl malonate-HDI trimmer condensate
b; ε-Caprolactam-blocked diphenylmethane diisocyanate
Vp; VpSBR latex
CSM; CSM latex
BP; BP latex In Examples 1 to 9 of the invention, as compared with comparative examples, the cords had high hardness and excellent bending fatigue resistance, and the fraying resistance after bending fatigue was also excellent. In addition, in the examples, the cord strength and breaking elongation tended to be lower as compared with the comparative examples having poor bundling properties; this is considered to be the influence of an increase in bundling properties caused by the formation of a firm film due to the penetration of the pre-treatment liquid (first adhesive treatment agent) into the fiber cord. However, the strength retention after bending fatigue of each fiber cord is high, and also the modulus (intermediate elongation) and dry heat shrinkage, which are important as a belt cord, are maintained at values indicating sufficient performance.

However, in the case where the proportion of, among the blocked isocyanate compounds in the pre-treatment liquid, the rigid high-temperature-dissociation blocked isocyanate compound $B_2$ is high as in Example 4, or in the case where the proportion of the epoxy compound in the pre-treatment liquid is high as in Example 7, there is a tendency that the adhesion film is slightly weak, resulting in slight decreases in cord hardness, fraying resistance, and adhesion.

In addition, in Comparative Example 1, only a bifunctional high-temperature-dissociation diisocyanate comproducing an adhesive-treated fiber cord, the method can be significantly effective in reducing the environmental impact and cost.

What is claimed is:

1. A method for producing a fiber cord for reinforcement, including treating a fiber cord in two stages with a pre-treatment liquid and an adhesive treatment liquid,
    the method being characterized in that
    the pre-treatment liquid contains two blocked isocyanate compounds that are a compound $A_2$ and a smaller amount of a compound $B_2$,
    the compound $A_2$ having an isocyanate group blocked with an aromatic compound,
    the aromatic compound is a dimethylpyrazole,
    the compound $B_2$ having an isocyanate group blocked with an aliphatic compound,
    the aliphatic compound is a lactam,
    the compound $B_2$ is an ε-caprolactam block structure, and
    a fiber cord having the pre-treatment liquid attached thereto is once subjected to a heat treatment, and then the adhesive treatment liquid is attached thereto, followed by a drying treatment.

2. The method for producing a fiber cord for reinforcement according to claim 1, wherein the unblocking temperature of the compound $A_2$ is lower than the unblocking temperature of the compound $B_2$.

3. The method for producing a fiber cord for reinforcement according to claim 1, wherein the compound $A_2$ has a dimethylpyrazole-blocked HDI (hexamethylene diisocyanate) trimer structure.

4. The method for producing a fiber cord for reinforcement according to claim 1, wherein the unblocking temperature of the compound $A_2$ is lower than the unblocking temperature of the compound $B_2$.

5. The method for producing a fiber cord for reinforcement according to claim 1, wherein
the adhesive treatment liquid is a resorcin-formalin-latex (RFL)-based adhesive,
the RFL-based adhesive comprises resorcin-formalin (RF) and latex (L) blended at a RF/L solids weight ratio of 1/3 to 1/16,
the latex includes (i) vinyl pyridine-styrene-butadiene (VpSBR) latex and/or chlorosulfonated polyethylene (CSM) latex and (ii) polybutadiene (PB) latex,
a total weight $L_1$ of the VpSBR latex and/or the CSM latex and a weight $L_2$ of the PB latex satisfy a solids weight ratio $L_1/L_2$ which is within a range of 25/75 to 75/25.

* * * * *